United States Patent
Gong et al.

(10) Patent No.: US 9,241,093 B2
(45) Date of Patent: Jan. 19, 2016

(54) GUIDED FILTER-BASED DETAIL ENHANCEMENT

(71) Applicant: Marvell World Trade Ltd., St. Michael (BB)

(72) Inventors: Yun Gong, Cupertino, CA (US); Dam Le Quang, Sunnyvale, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 0 days.

(21) Appl. No.: 14/220,528

(22) Filed: Mar. 20, 2014

(65) Prior Publication Data

US 2014/0285719 A1    Sep. 25, 2014

Related U.S. Application Data

(60) Provisional application No. 61/804,522, filed on Mar. 22, 2013.

(51) Int. Cl.
*H04N 5/00* (2011.01)
*H04N 5/14* (2006.01)

(52) U.S. Cl.
CPC ............................... *H04N 5/142* (2013.01)

(58) Field of Classification Search
USPC ......... 348/606, 607, 613, 622–631, 659–661, 348/668, 671, 672
See application file for complete search history.

(56) References Cited

U.S. PATENT DOCUMENTS

| | | | |
|---|---|---|---|
| 5,799,111 A * | 8/1998 | Guissin | 382/254 |
| 7,538,822 B2 * | 5/2009 | Lee et al. | 348/606 |
| 8,023,762 B2 * | 9/2011 | Rhee | 382/260 |
| 8,264,615 B2 | 9/2012 | Sahu et al. | |
| 8,270,756 B2 * | 9/2012 | Ou et al. | 382/275 |
| 8,374,460 B2 * | 2/2013 | Hara et al. | 382/275 |
| 2002/0028025 A1 * | 3/2002 | Hong | 382/260 |
| 2002/0080281 A1 * | 6/2002 | Yoshiyama et al. | 348/623 |
| 2002/0140815 A1 * | 10/2002 | Herman et al. | 348/180 |
| 2004/0066978 A1 * | 4/2004 | Nanbu | 382/261 |
| 2004/0071363 A1 * | 4/2004 | Kouri et al. | 382/276 |
| 2006/0056722 A1 * | 3/2006 | Moroney | 382/266 |
| 2008/0106647 A1 * | 5/2008 | Kimura et al. | 348/607 |
| 2010/0165122 A1 * | 7/2010 | Castorina et al. | 348/208.4 |

(Continued)

OTHER PUBLICATIONS

He, Kaiming, Guided Image Filtering, Oct. 2, 2012, Pttern Aalysis and Machine Intelligence, IEEE Transaction, vol. 35, Issue:6).*

(Continued)

*Primary Examiner* — Jefferey Harold
*Assistant Examiner* — Humam Satti (57) ABSTRACT

Systems and methods for generating a detail-enhanced video signal are provided. In a method for generating the detail-enhanced video signal, an input video signal is received. A first signal that is a linear transformation of the input video signal is generated. A detail signal is generated by determining a difference between the input video signal and the first signal, where the detail signal includes information that is added to the input video signal to generate the detail-enhanced video signal. A filtered detail signal is generated by removing noise from the detail signal. The filtered detail signal is multiplied by a gain function to generate a second signal. The gain function is based on an amount of variance in the input video signal. The input video signal and the second signal are combined to generate the detail-enhanced video signal.

20 Claims, 9 Drawing Sheets

(56) References Cited

U.S. PATENT DOCUMENTS

2011/0019094 A1* 1/2011 Rossignol et al. ............ 348/607
2013/0002959 A1* 1/2013 Sahu et al. .................... 348/606
2013/0129156 A1* 5/2013 Wang et al. ................... 382/107

OTHER PUBLICATIONS

H, Kaiming, Guided Image Filtering, Oct. 2, 2012, Pattern Analysis and Machine Intelligence, IEEE Transaction, vol. 35; issue:6.*

Zhang et al (Skin Color Enhancement Based on Favorite Skin Color in HSV Color Space, IEEE Transactions on Consumer Electronics, vol. 56, No. 3, Aug. 2010.*

He, Kaiming (1), Sun, Jian (2), and Tang, Xiaoou (3); "Guided Image Filtering", (1) Department of information Engineering, The Chinese University of Hong Kong, (2) Microsoft Research Asia, (3) Shenzhen Institutes of Advanced Technology, Chinese Academy of Sciences, China, undated, 14 pages.

X.-N. Zhang et al., "Skin Color Enhancement Based on Favorite Skin Color in HSV Color Space," IEEE Transaction on Consumer Electronics, vol. 56, No. 3, Aug. 2010.

C Tomasi, et al., "Bilateral Filtering for Gray and Color Images," ICCV Proceedings of the Sixth International Conference on Computer Vision, IEEE Computer Society, pp. 839-846, 1998.

Kaiming He, et al., "Guided Image Filtering," IEEE Transactions on Pattern Analysis and Machine Intelligence, Journal of Latex Class Files, 2012.

Vladimir Vezhnevets, et al., "A Survey on Pixel-Based Skin Color Detection Techniques," Proc. Graphicon, vol. 3. 2003, pp. 85-92.

Farbman, Zeev, et al. "Edge-preserving decompositions for multi-scale tone and detail manipulation." ACM Transactions on Graphics (TOG). vol. 27. No. 3 ACM, 2008.

International Search Report & Written Opinion mailed Jun. 19, 2015 in related/corresponding International PCT Patent Appl. No. PCT/US14/31311, filed Mar. 20, 2014.

* cited by examiner

GUIDED FILTER-BASED DETAIL ENHANCEMENT

CROSS-REFERENCE TO RELATED APPLICATIONS

This disclosure claims priority to U.S. Provisional Patent Application No. 61/804,522, filed on Mar. 22, 2013, which is incorporated herein by reference in its entirety.

TECHNICAL FIELD

The technology described in this document relates generally to the field of video processing and more particularly to image detail and edge enhancement.

BACKGROUND

An edge enhancer comprising both fine detail enhancement (i.e., "Detail EE") and luminance transition improvement (LTI) is used to improve transitions in an input video signal. Applied in parallel, with Detail EE being applied on small transitions and with LTI being applied on large transitions, the output of the edge enhancer is the sum of the original signal ($Y_{in}$), the detail enhancement ($\Delta Y_{det}$), and the transition improvement ($\Delta LTI$). In example systems, Detail EE uses the principle of un-sharp masking and causes overshoot or ringing on edges that can enhance small details in the input video signal.

SUMMARY

The present disclosure is directed to systems and methods for generating a detail-enhanced video signal. An example system for generating a detail-enhanced video signal includes a filter that receives an input video signal. The filter is configured to generate a first signal that is a linear transformation of the input video signal and generate a detail signal. The detail signal is generated by determining a difference between the input video signal and the first signal, where the detail signal includes information that is added to the input video signal to generate the detail-enhanced video signal. The system also includes a noise reducer configured to generate a filtered detail signal by removing noise from the detail signal. The system also includes a multiplier configured to multiply the filtered detail signal by a gain function to generate a second signal. The gain function is based on an amount of variance in the input video signal. The system further includes an adder configured to combine the input video signal and the second signal to generate the detail-enhanced video signal.

In another example, in a method for generating a detail-enhanced video signal, an input video signal is received. A first signal that is a linear transformation of the input video signal is generated. A detail signal is generated by determining a difference between the input video signal and the first signal, where the detail signal includes information that is added to the input video signal to generate the detail-enhanced video signal. A filtered detail signal is generated by removing noise from the detail signal. The filtered detail signal is multiplied by a gain function to generate a second signal. The gain function is based on an amount of variance in the input video signal. The input video signal and the second signal are combined to generate the detail-enhanced video signal.

DETAILED DESCRIPTION

Figure 1:
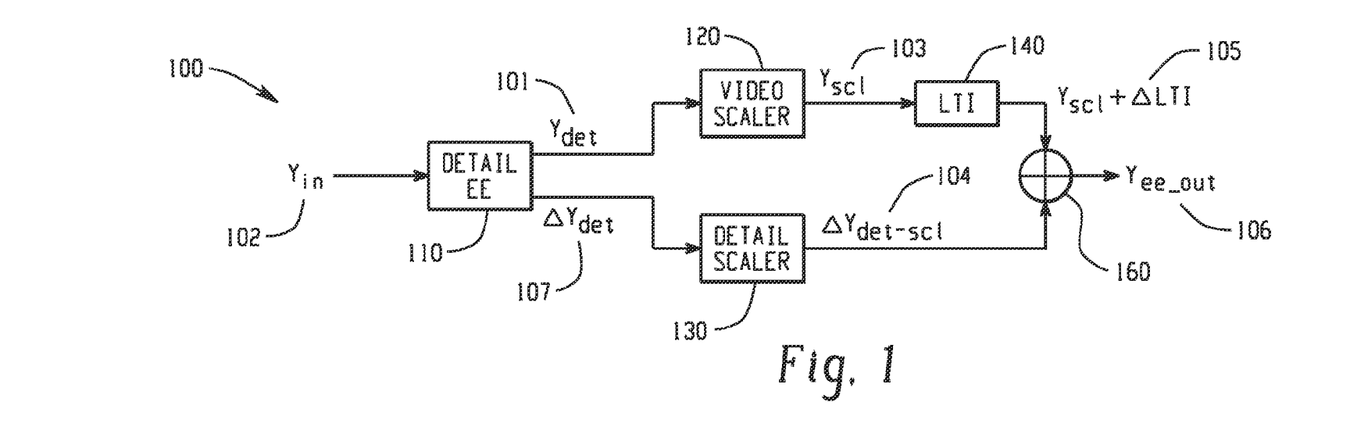
FIG. 1 shows a block diagram of an example edge enhancement architecture.

FIG. 1 shows a block diagram 100 of an example edge enhancement architecture, where the example edge enhancement architecture is employed in a video post processing (VPP) system. In FIG. 1, a video signal $Y_{in}$ 102 is input into the edge enhancement architecture that includes both a fine detail enhancement ("Detail EE") module 110 and a luminance transition improvement ("LTI") module 140. The video signal $Y_{in}$ 102 is first input into the Detail EE module 110, and the Detail EE module 110 outputs a detail signal $\Delta Y_{det}$ 107 that represents enhanced fine details of the video signal $Y_{in}$ 102. The detail signal $\Delta Y_{det}$ 107 is up-scaled at detail scaler 130 to generate signal $\Delta Y_{det}$ 104.

Another output of the Detail EE module 110 is $Y_{det}$ 101. In the example of FIG. 1, $Y_{det}$ 101 comprises the input video signal $Y_{in}$ 102 passed through the Detail EE module 110 without adjustment. In another example, $Y_{det}$ 101 comprises the detail signal $\Delta Y_{det}$ 107 added to input video signal $Y_{in}$ 102 to create a video signal with fine details enhanced. $Y_{det}$ 101 is up-scaled in video scaler 120 to generate a scaled signal $Y_{scl}$ 103, and the scaled signal $Y_{scl}$ 103 is input into the LTI module 140. In the example of FIG. 1, the video scaler 120 and the detail scaler 130 include filters that comprise the same scaler filters. In another example, the video scaler 120 and the detail scaler 130 include filters that comprise different scaler filters. The scaled signal $Y_{scl}$ 103 plus an LTI improvement signal $\Delta LTI$ is the output 105 of the LTI module 140. The output signal $Y_{scl}+\Delta LTI$ 105 is added to the scaled detail enhanced signal $\Delta Y_{det-scl}$ 104 in the spatial domain at adder 160. The final output of the edge enhancement architecture, $Y_{ee-out}$ 106, is the edge-enhanced and scaled signal.

As illustrated in FIG. 1, the example detail enhancement architecture includes two independent modules, a luma (Y) detail enhancement module (i.e., comprising the Detail EE module 110) and a transient improvement module (i.e., comprising the LTI module 140). The transient improvement module is used for enhancing large edges of the input video signal $Y_{in}$ 102, while the luma detail enhancement module is used to enhance fine edges of the input video signal $Y_{in}$ 102. FIGS. 2-7 and their corresponding description herein are directed to aspects of detail enhancement that are performed in the Detail EE module 110. As described in further detail below, the detail enhancement performed in the Detail EE module 110 utilizes a guided image filter for extracting details from an input image. By contrast, alternative detail enhancement methods do not use a guided image filter and instead use fixed parameters in either high-pass or bandpass filters to extract details from the input image. Such alternative detail enhancement methods result in large details around edges and few details in dark or relatively smooth regions of the input video signal $Y_{in}$ 102. In the alternative detail enhancement methods, with a strong enhancement gain, overshoot or temporal flicker is often observed around edges, while the details in the dark regions are still not efficiently enhanced. As detailed below, with reference to FIGS. 2-7, the Detail EE module 110 utilizing the guided image filter may overcome the deficiencies inherent in the alternative detail enhancement methods.

Figure 2:
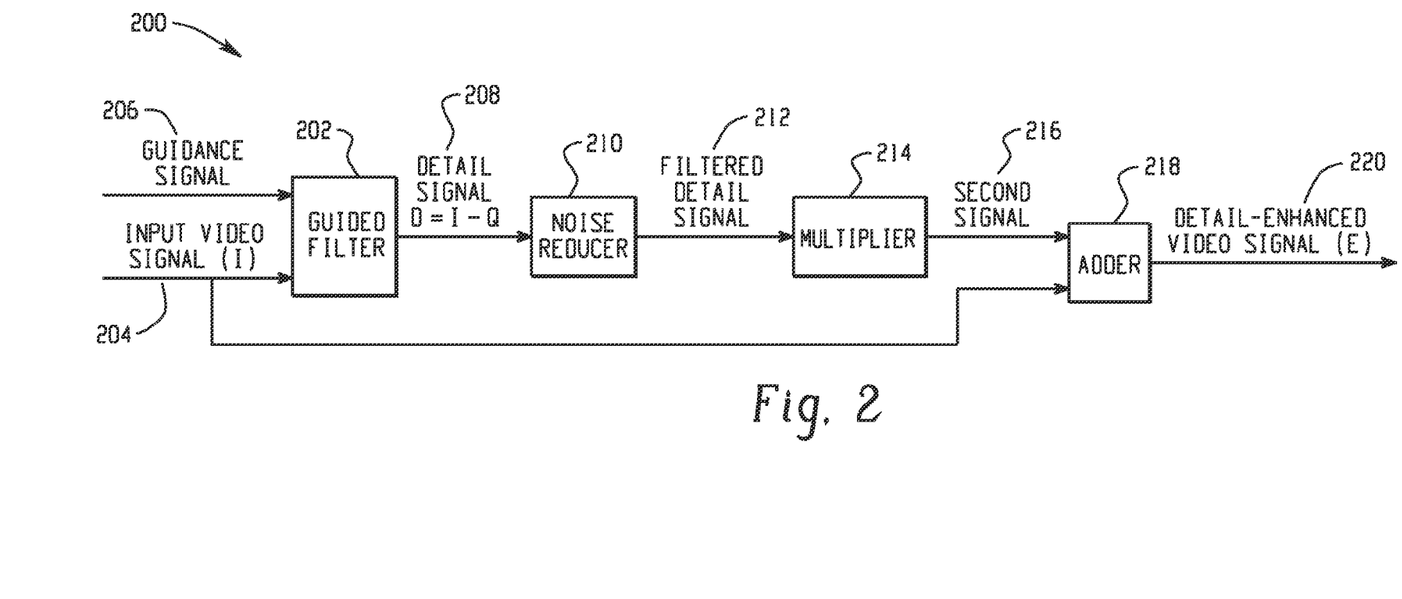
FIG. 2 depicts a block diagram of an example system for generating a detail-enhanced video signal.

FIG. 2 depicts a block diagram 200 of an example system for generating a detail-enhanced video signal 220. In the example system of FIG. 2, a guided image filter 202 receives an input video signal (I) 204 and a guidance signal 206. The input video signal 204 includes one or more images, and the example system is configured to add details to the one or more images to generate the detail-enhanced video signal 220. In an example, the one or more images of the input video signal 204 include video frames. The guidance signal 206 similarly includes one or more images, and the content of the guidance signal 206 may be considered by the guided image filter 202 in performing a filtering operation. In an example system, the guidance signal 206 is used in enforcing constraints on the guided image filter 202, and in another example system, filter kernels are built using the guidance signal 206. In an example, the guidance signal 206 is the input video signal 204, such that the two separate signals 204, 206 are not input to the guided image filter 202, and a single signal representing both of the signals 204, 206 is instead received by the filter 202.

The guided image filter 202 is configured to generate a first signal (Q) that is a linear transformation of the guidance signal 206. As described in further detail below, with reference to FIGS. 3A-3D, the linear transformation involves determining average mean and variance values for a plurality of windows of radius r that cover a pixel of the guidance signal 206. Using the first signal and the input video signal 204, the guided image filter 202 generates a detail signal (D) 208. The detail signal 208 is determined by taking a difference between the input video signal 204 and the first signal, such that the detail signal 208 is equal to I–Q. The detail signal 208 includes information that is added to the input video signal 204 to generate the detail-enhanced video signal 220, as described in further detail below.

The system of FIG. 2 further includes a noise reducer 210 configured to generate a filtered detail signal 212 by removing noise from the detail signal 208. A multiplier 214 receives the filtered detail signal 212 and multiplies the filtered detail signal 212 by a gain function to generate a second signal 216. The gain function is based on an amount of variance in the input video signal 204, where the variance is indicative of an activity level or an amount of change within the input video signal 204. An adder 218 receives the input video signal 204 and the second signal 216. The adder 218 is configured to combine the input video signal 204 and the second signal 216 to generate the detail-enhanced video signal 220.

In an example, the input video signal 204, the guidance signal 206, the detail signal 208, the filtered detail signal 212, and the second signal 216 each comprise a plurality of pixels. In an example, the plurality of pixels is a particular frame of a video signal. Further, as described in greater detail below, the multiplier 214 is configured to multiply a pixel of the plurality of pixels included in the filtered detail signal 212 by a gain value of the gain function. The gain value is based on a variance of a group of pixels, where the group of pixels includes a pixel of the plurality of pixels included in the input video signal 204. The pixel of the plurality of pixels included in the filtered detail signal 212 and the pixel of the plurality of pixels included in the input video signal 204 have same x-y coordinates, such that the pixels used are corresponding pixels in the different images.

Figure 3A:
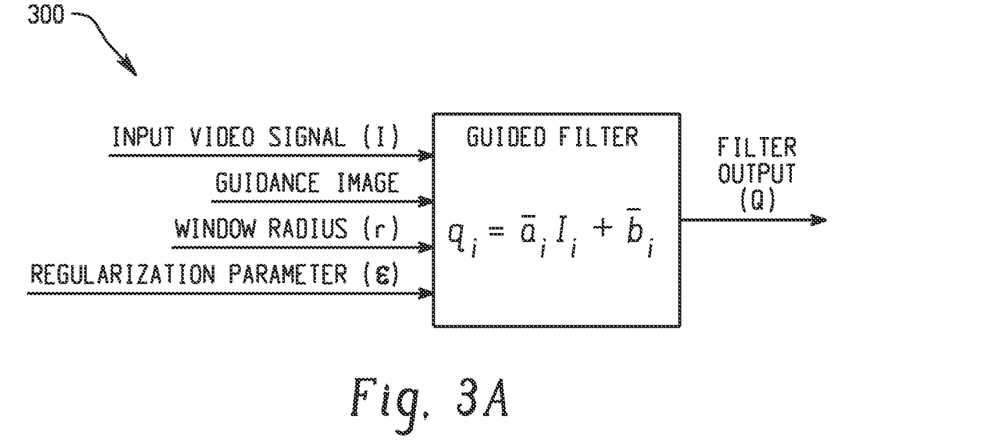
FIG. 3A depicts an example guided filter and corresponding inputs and outputs to the filter.

FIG. 3A depicts an example guided filter 300 and corresponding inputs and outputs to the filter 300. The guided filter 300 receives the inputs including an input video signal containing an input image (I) to be filtered, a guidance image, a window radius (r), and a regularization parameter (ε). In the example of FIG. 3A, where the guided filter 300 is used to perform a detail enhancement procedure, the guidance image and the input image are the same. Using the input image (I) to be filtered, the guided filter 300 calculates a filtering output $q_i$ for every pixel i ∈ I using the following linear transformation:

$$q_i = \bar{a}_i I_i + \bar{b}_i, \quad \text{(Equation 1)}$$

where $$\bar{a}_i = \frac{1}{|\omega|}\sum_{k \in \omega_i} a_k \text{ and } \bar{b}_i = \frac{1}{|\omega|}\sum_{k \in \omega_i} b_k$$

are the average coefficients of all windows with the radius r that cover the pixel i, and |ω| is the number of windows used in determining the average coefficients. For a window $\omega_k$ centered at the pixel k, $$a_k = \frac{\sigma_k^2}{\sigma_k^2 + \varepsilon}, \quad \text{(Equation 2)}$$

$$b_k = (1 - a_k)\mu_k, \quad \text{(Equation 3)}$$

where $\sigma_k^2$ and $\mu_k$ are the variance and mean, respectively, of pixels in the window $\omega_k$, and ε is the regularization parameter. The filter output (Q) comprises the filtering output $q_i$ for every pixel i ∈ I.

Figure 3B:
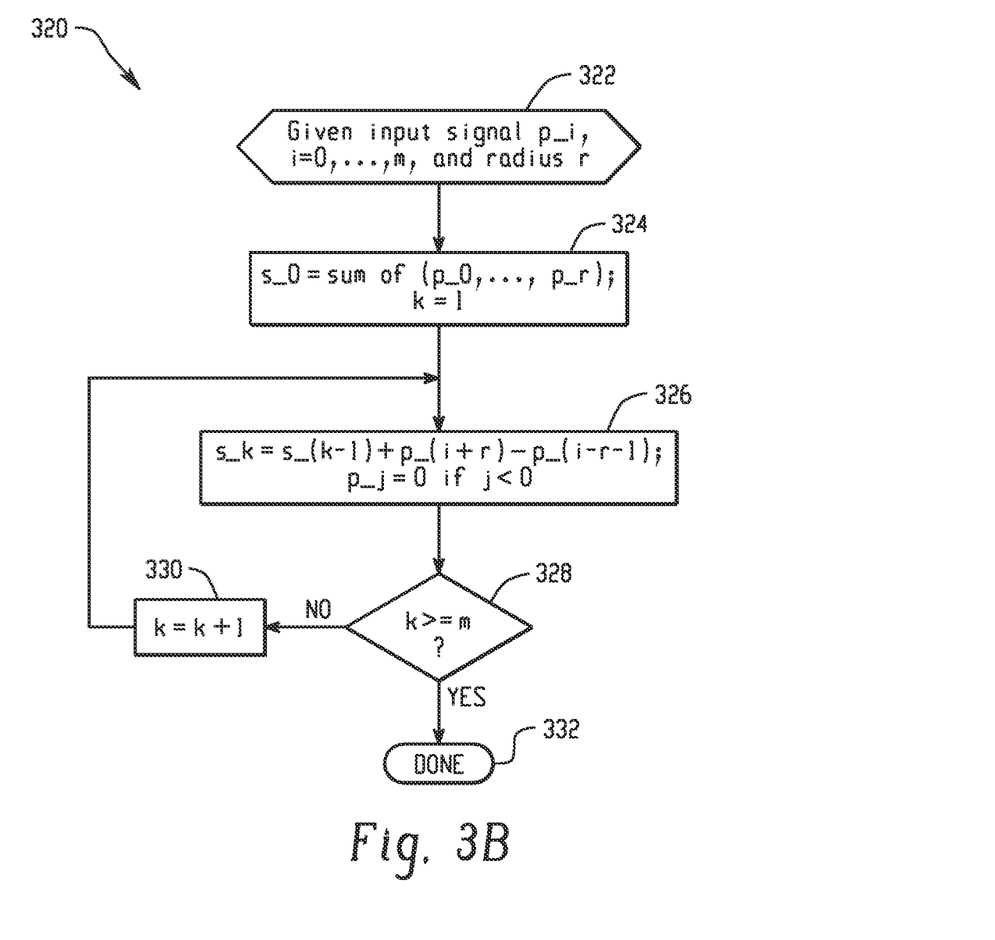
FIG. 3B depicts a flowchart illustrating example steps of a one dimensional (1D) moving sum method for computing mean and variance values with box windows of radius r.

FIG. 3B depicts a flowchart 320 illustrating example steps of a one dimensional (1D) moving sum method for computing mean and variance values with box windows of radius r. The mean and variance values with box windows of the radius r are calculated by applying a simple 1D moving sum method horizontally and vertically. At 322, an input signal p_i is received, where i=0, . . . , m. Additionally, at 322, the radius r parameter is received. At 324, a value of s_0 is determined, where s_0=sum of (p_0, . . . , p_r). Further, at 324, a variable k is set equal to 1 (k=1). At 326, a value s_k is determined, where s_k=s_(k−1)+p_(i+r)−p_(i−r−1). Additionally, at 326, p_j is set to 0 if j<0. At 328, a determination is made as to whether the variable k is greater than or equal to m. If the variable k is not greater than or equal to m, then the flowchart 320 proceeds to 330, where the variable k is incremented by 1 (k=k+1). After the variable k is incremented by 1 at 330, the flowchart 320 returns to 326. If it is determined at 328 that the variable k is greater than or equal to m, then the flowchart 320 is complete at 332.

Figure 3C:
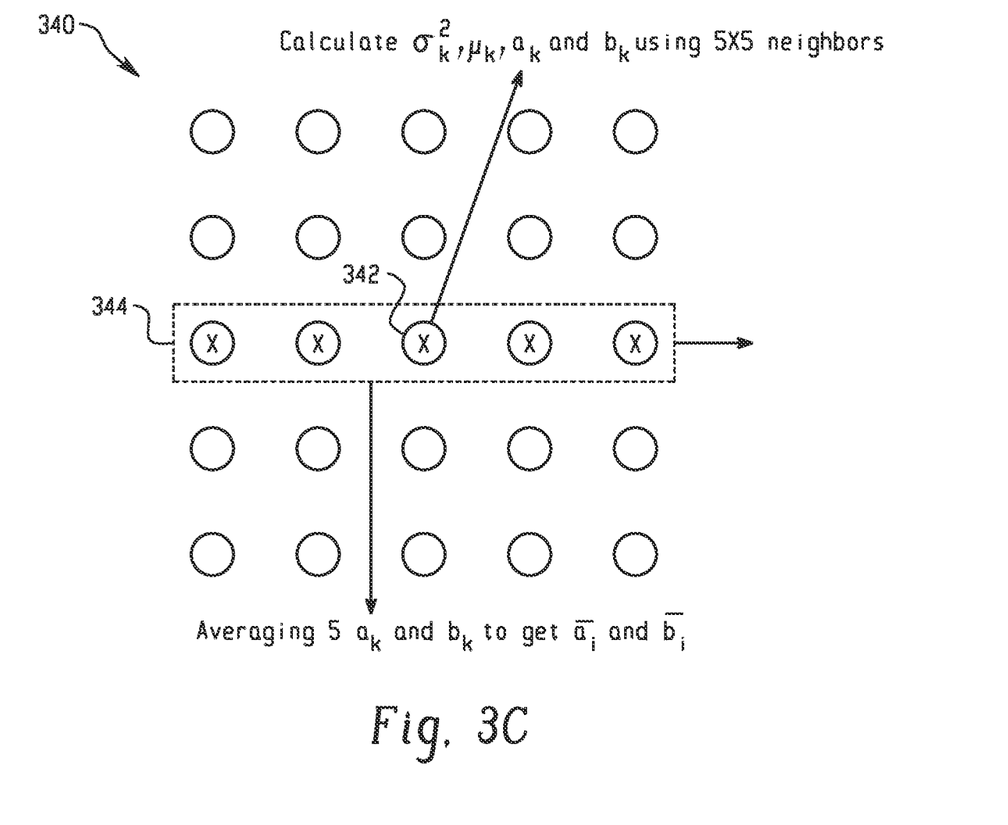
FIG. 3C depicts a box of pixels with a window radius of two pixels.

FIG. 3C depicts a box of pixels 340 with a window radius of two pixels. In an example, in the calculating of $\bar{a}_i$ and $\bar{b}_i$ in Equation 1, the window radius r is set equal to two pixels in order to limit the computational cost in the guided image filter 300. Therefore, for a pixel k 342, 5×5 neighboring pixels (as illustrated in the box 340 of FIG. 3C) are used to calculate the variance $\sigma_k^2$ and the mean $\mu_k$ values. After calculating the variance $\sigma_k^2$ and the mean $\mu_k$ values, the $a_k$ and $b_k$ values are calculated according to Equations 2 and 3. In order to not increase memory requirements, the average of five $a_k$ and $b_k$ values shown in the dashed window 344 are calculated to determine the $\bar{a}_i$ and $\bar{b}_i$ values in Equation 1. By making the calculations in this manner, only five line buffers are used.

Figure 3D:
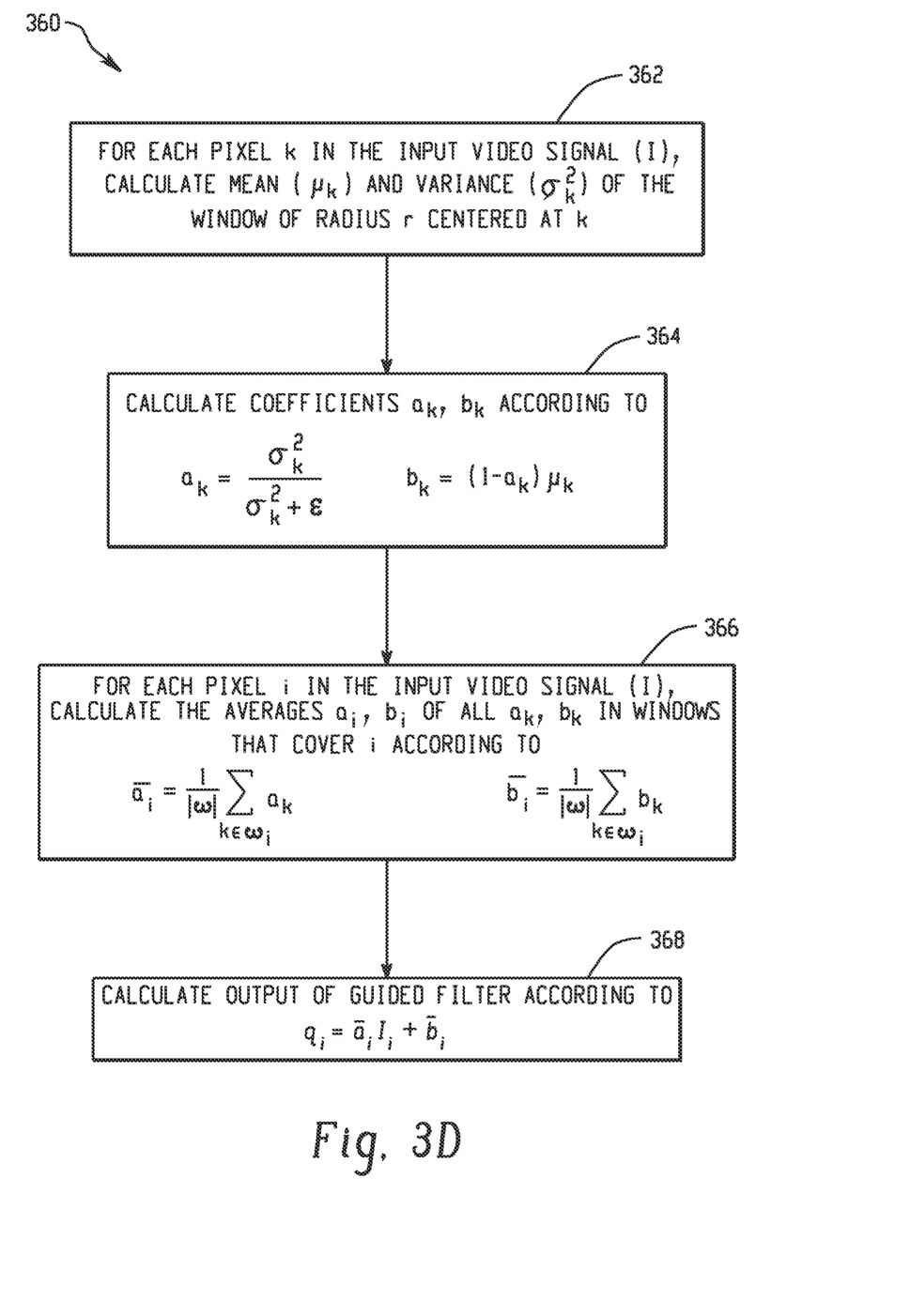
FIG. 3D depicts a flowchart illustrating example steps performed by the guided filter.

FIG. 3D depicts a flowchart 360 illustrating example steps performed by the guided filter 300. At 362, for each pixel k in the input video signal (I), the variance $\sigma_k^2$ the mean $\mu_k$ of the window $\omega_k$ of radius r centered at the pixel k are calculated. At 364, the coefficients $a_k$ and $b_k$ calculated according to the Equations 2 and 3. At 366, for each pixel i in the input video signal, the average coefficients $\bar{a}_i$ and $\bar{b}_i$ of all $a_k$ and $b_k$ in windows that cover the pixel i are calculated according to $$\bar{a}_i = \frac{1}{|\omega|} \sum_{k \in \omega_i} a_k \text{ and } \bar{b}_i = \frac{1}{|\omega|} \sum_{k \in \omega_i} b_k.$$

At 368, the output of the guided image filter is calculated according to Equation 1.

The guided image filter 300 of FIG. 3A has an edge-preserving property, and the edge-preserving property can be explained by considering two cases. First, for a high activity area (i.e., a high variance area), the input image changes a relatively large amount within the window $\omega_k$, such that $\sigma_k^2 \gg \epsilon$. Therefore, for the high activity area, $a_k \approx 1$ and $b_k \approx 0$. For a pixel within the high activity area, $\bar{a} \approx 1$ and $\bar{b} \approx 0$, such that the filtered pixel value remains relatively unchanged.

On the other hand, for a flat or smooth area, the pixel values are almost constant in the window $\omega_k$. Therefore, $\sigma_k^2 \ll \epsilon$, and $a_k \approx 0$ and $b_k \approx \mu_k$. For a pixel within the flat or smooth area, $\bar{a} \approx 0$ and $\bar{b} \approx \bar{\mu}$, and the filtered pixel becomes the average of the neighboring pixels in the windows considered. By adjusting the regularization parameter $\epsilon$, the range of edge or activity areas that are preserved is controlled. The ability to control the range of edge or activity areas that are preserved is desirable for detail enhancement in a television system because certain ranges of edges may be preserved for later processing after detail enhancement or for visual effects.

Figure 4:
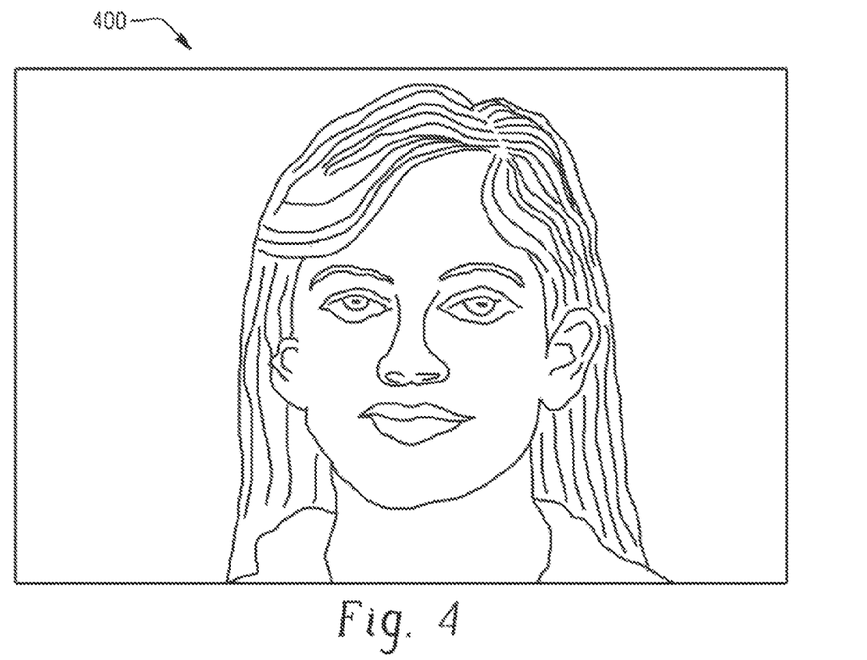
FIG. 4 depicts an example detail signal (D) determined by taking a difference between an input video signal (I) and a first signal that is a linear transformation of a guidance signal (Q), such that D=I−Q.

FIG. 4 depicts an example detail signal (D) 400 determined by taking a difference between an input video signal (I) and a first signal (Q) that is a linear transformation of a guidance signal, such that D=I−Q. As explained above, with reference to FIGS. 3A-3D, the first signal is a filtered image generated by a guided image filter. For example, Equation 1 describes the output of the guided image filter, $q_i$, which is an output corresponding to a single pixel i of an input image I. The first signal is an image that comprises a plurality of the $q_i$ values for each of the pixels of the input image I. The example detail signal 400 includes information that is added to the input video signal to generate a detail-enhanced video signal.

Figure 5A:
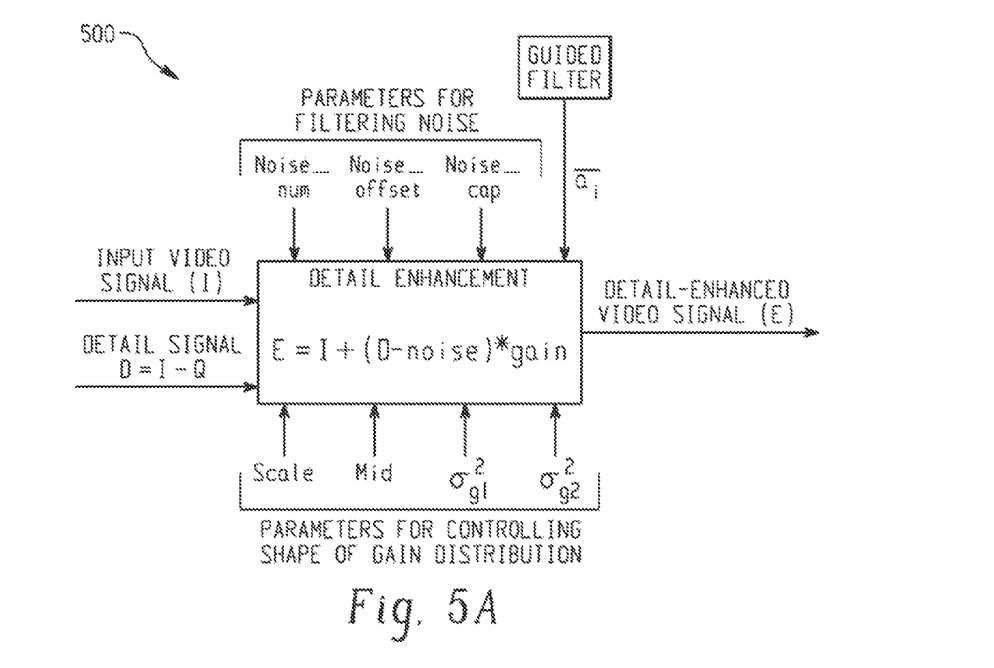
FIG. 5A depicts an example detail enhancement module and corresponding inputs and outputs to the module.

FIG. 5A depicts an example detail enhancement module 500 and corresponding inputs and outputs to the module 500. As described above, a detail image D=I−Q is generated by a guided image fitter, where I is an input image and Q is an output of the guided image filter that is obtained by taking a linear transformation of a guidance image. FIG. 5A depicts the input image I and the detail image D=I−Q being received by the detail enhancement module 500. Based on these inputs and others described below, the detail enhancement module 500 generates a detail-enhanced video signal E according to E=I+(D−noise)*gain. The variables "gain" and "noise" that are used in calculating the detail-enhanced video signal E are selected to control how strongly details of the detail image D are added to the input image I (i.e., an intensity with which details of the detail image D are added to the input image I). With reference to FIG. 1, the detail image $\Delta Y_{det}$=(D−noise)*gain, and $Y_{det}$=E or I. $Y_{det}$ is selected to be equal to either E or I depending on whether the detail enhancement is performed at the Detail EE module 110 or at a later, downstream module.

The "gain" function used in determining the detail-enhanced video signal E according to E=I+(D−noise)*gain allows the module 500 to provide detail enhancement that varies based on the activity level (i.e., variance) within various regions of the input image I. As illustrated in FIG. 5A, the detail enhancement module 500 receives the coefficient $\bar{a}$ that is used in the guided image filter. The coefficient $\bar{a}$ provides the module 500 with the activity level information, which is highly correlated to frequency information, for a small area where a current pixel of the input image I is located. An expression for the gain function is $$\text{gain} = \begin{cases} \text{scale} * \exp\left(-\frac{(x-mid)^2}{\sigma_{g1}^2}\right) & \text{for } x < mid \\ \text{scale} * \exp\left(-\frac{(x-mid)^2}{\sigma_{g2}^2}\right) & \text{for } x >= mid \end{cases} \quad \text{(Equation 4)}$$

where x is the coefficient $\bar{a}$ for the current pixel, and scale, mid, $\sigma_{g1}^2$, and $\sigma_{g2}^2$ are parameters received by the detail enhancement module 500 that control a Gaussian distribution shape of the gain function. By controlling the Gaussian distribution shape of the gain function using the variables $\bar{a}$, scale, mid, $\sigma_{g1}^2$, and $\sigma_{g2}^2$, the module 500 is able to provide detail enhancement that varies based on the activity level (i.e., variance) within various regions of the input image I.

Figure 5B:
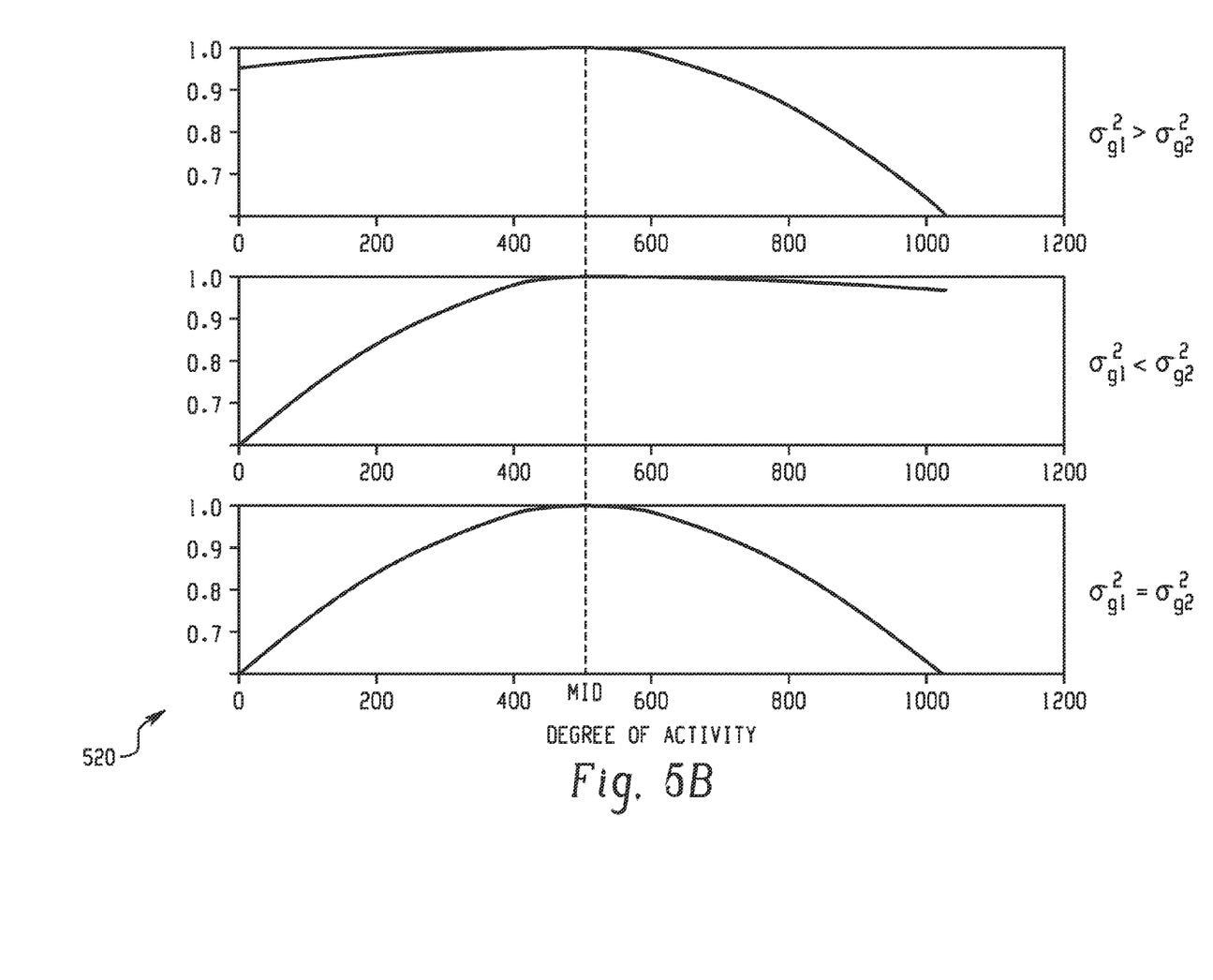
FIG. 5B depicts exemplary gain functions for use in the detail enhancement module.

FIG. 5B depicts exemplary gain functions 520 for use in the detail enhancement module 500. The exemplary gain functions 520 depict three types of shapes that can be implemented by adjusting parameters of the detail enhancement module 500, where the degree of activity is the integer version of x in Equation 4 with a range of [0, 1024], mid is 500, and scale is 1. In a top-most example gain function in FIG. 5B, $\sigma_{g1}^2 > \sigma_{g2}^2$, such that the gain function has maximum values for lower degrees of activity, and the gain function has lower values for higher degrees of activity. In a middle example gain function in FIG. 5B, $\sigma_{g1}^2 < \sigma_{g2}^2$, such that the gain function has maximum values for higher degrees of activity, and the gain function has lower values for lower degrees of activity. In a bottom-most example gain function in FIG. 5B, $\sigma_{g1}^2 = \sigma_{g2}^2$, such that the gain function has a maximum value near the value of mid, and the gain function decreases as the activity level is increased or decreased.

In an example, the input video image I includes low-variance portions, where the low-variance portions of the input video image I have a relatively low variance (i.e., level of activity). The input video image I also has high-variance portions, where the high-variance portions have a relatively high variance (i.e., a relatively high level of activity). As depicted in the top-most gain function of FIG. 5B, the gain function can be designed to include a distribution that causes the information from the detail signal to be added to the low-variance portions of the input video image I at a relatively high intensity. As is further depicted in the top-most gain function of FIG. 5B, the gain function can also be designed such that the distribution causes the information from the detail signal to be added to the high-variance portions of the input video image I at a relatively low intensity. As depicted in the middle example gain function of FIG. 5B, the distribution function may also be designed to function in an opposite manner (i.e., the distribution can be designed to cause the information from the detail signal to be added to the law-variance portions of the input video image I at a relatively low intensity, and to cause the information from the detail signal to be added to the high-variance portions of the input video image I at a relatively high intensity).

In the Equation 4, the parameters mid, scale, $\sigma_{g1}^2$, and $\sigma_{g2}^2$ may be values that are set by users, or the parameters may be values that are set by software based on the characteristics of the video being displayed and users' enhancement requirements. In an example, default parameters are selected to cause mild enhancement. The scale parameter received by the detail enhancement module 500 and used in the Equation 4 is the parameter that directly controls the intensity of the enhancement. In an example, the choice of the scale parameter is subjective and performed manually. In another example, a set of rules is provided to generate the scale parameter based on the characteristics of the video being displayed. The scale parameter is chosen to create not too much overshoot or saturation while maintaining strong enhancement. In certain examples, a number of saturated pixels from a current frame are collected, and the collected pixels are used to decrease or increase the scale parameter for a next frame. In an example, the scale parameter is set in firmware.

The $\sigma_{g1}^2$ and $\sigma_{g2}^2$ parameters received by the detail enhancement module 500 and used in the Equation 4 define the shape of the gain function. The larger the $\sigma_{g1}^2$ and $\sigma_{g2}^2$ parameters are, the more spread out the enhancement is over the different degrees of activity. A default value of 128 for both of the $\sigma_{g1}^2$ and $\sigma_{g2}^2$ parameters with $\bar{a}$ in the range of (0, 1023) is used unless more concentrated or spread out enhancement is desired.

The mid parameter received by the detail enhancement module 500 and used in the Equation 4 determines which range of edge or activity areas are to be enhanced the most. For example, if enhancement is desired for high activity or sharp edge areas, a large mid parameter is used. On the other hand, a small mid parameter is used for enhancement of relatively low activity areas. The default value of mid is 200 in the range of (0, 1023).

With reference again to FIG. 5A, the detail enhancement module 500 is depicted as receiving parameters for filtering noise that are noise_num, noise_offset, and noise_cap. The parameters noise_num, noise_offset, and noise_cap are used to determine the "noise" variable included in the equation E=I+(D−noise)*gain that is used by the enhancement module 500. If noisy areas of the input image are enhanced, the output image appears grainy and unpleasant. The enhancement scheme used by the detail enhancement module 500 avoids enhancing noisy areas of the input image. In one example, a given level of noise is subtracted from all of the details of the detail image D. In another example, the noisy areas of the detail image D are detected and excluded from the enhancement. In the detail enhancement module 500 of FIG. 5A, linear transform parameters used in the Equation 1 are utilized to control the noise level given the fact that noise in flat or smooth areas is more noticeable (i.e., visible or distracting) than noise in high activity areas. A small value of $\bar{a}$ indicates a flat area, and a large value of $\bar{a}$ indicates a high activity area. The noise level for each pixel is determined according to $$\text{noise\_calculated} = \frac{\text{noise\_num}}{\bar{a}} + \quad \text{(Equation 5)}$$

noise_offset if (noise_caluclated > noise_cap), noise_calculated = noise_cap;

where noise_num, noise_offset, and noise_cap are parameters received by the detail enhancement module 500 that can be set via registers.

Figure 5C:
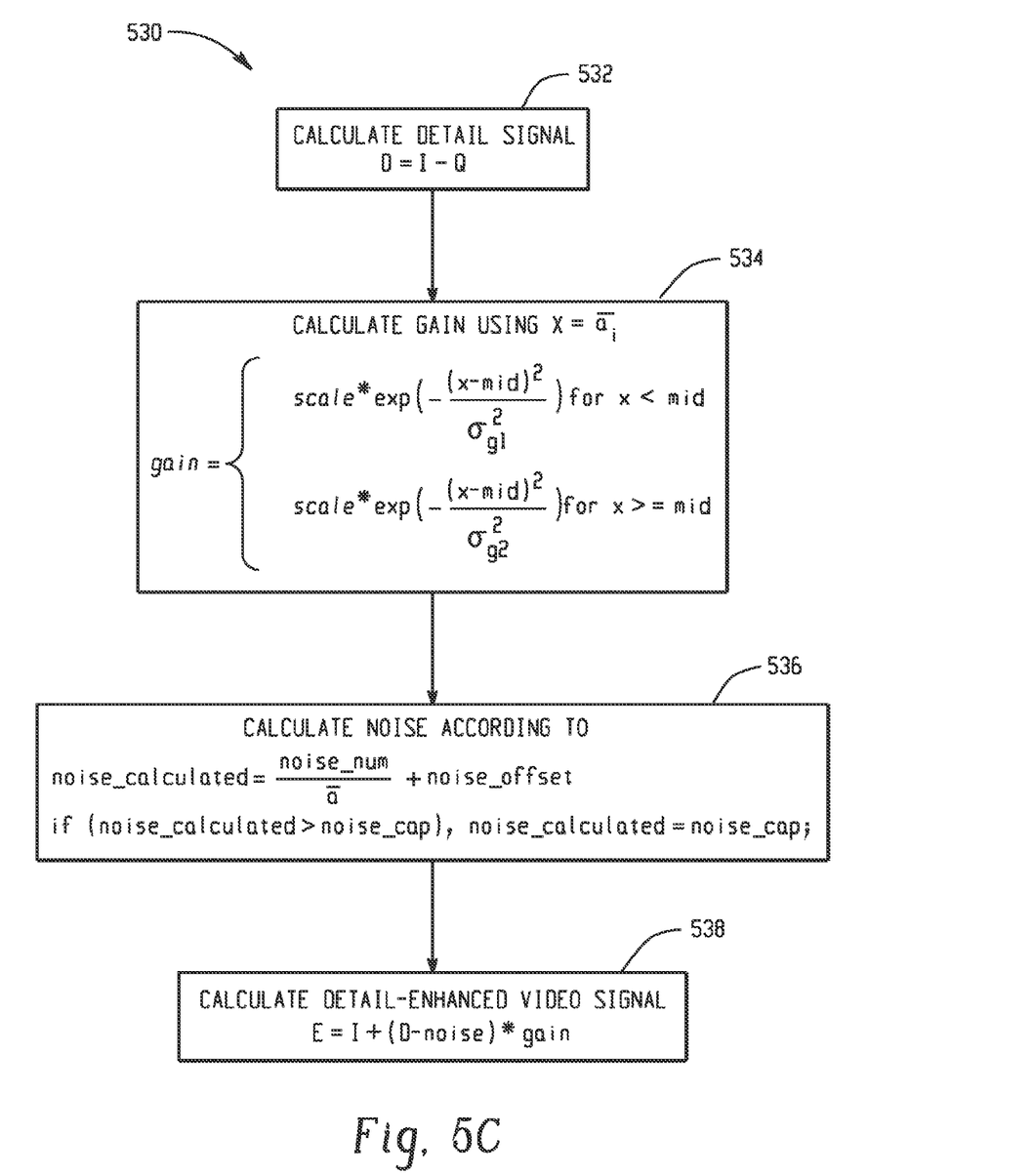
FIG. 5C depicts a flowchart illustrating example steps performed by the detail enhancement module.

FIG. 5C depicts a flowchart 530 illustrating example steps performed by the detail enhancement module 500. At 532, the detail image D is calculated according to D=I−Q. In other examples, the detail image D is calculated in the guided image filter (e.g., as described above with reference to FIGS. 3A-3D). At 534, the gain parameter is calculated using the parameter $\bar{a}$ according to Equation 4, where the parameter $\bar{a}$ was also used in the guided image fitter. At 536, the noise parameter is calculated according to Equation 5. At 538, the detail-enhanced video image E is calculated according to E=I+(D−noise)*gain.

In an example, a human skin tone detector is used in a system for generating a detail-enhanced video signal. In one example, enhancing the details in skin areas of an image leads to an unnatural looking detail-enhanced image. In other examples, a mild enhancement of the details in the skin areas is aesthetically pleasing. Therefore, it is desirable to detect skin areas and disable or enable the enhancement of these areas through individual controls that are realized by a different set of detail gain and noise parameters.

In an example, an ICrCb color space based flesh tone detector is implemented in the system for generating the detail-enhanced video signal. In another example, a HSV color space based flesh tone detector is used with a single color space. In the another example, where the HSV based skin color detection scheme is integrated into a detail enhancement module, when a pixel is identified as skin color, a different set of detail gain and noise parameters are used. These parameters can be adjusted based on a viewer's preference. A conversion from RGB to HSV is determined according to $$H_1 = \arccos\left(\frac{((R-G)+(R-B))/2}{\sqrt{(R-G)^2+(R-B)(G-B)}}\right) \quad \text{(Equation 6)}$$

$$H = \begin{cases} H_1, & \text{if } B \leq G \\ 360° - H_1, & \text{if } B > G \end{cases}$$

$$S = \frac{\max(R,G,B) - \min(R,G,B)}{\max(R,G,B)}$$

$$V = \frac{\max(R,G,B)}{1023}.$$

Any pixel satisfying the following conditions is identified as skin color:

$$\begin{cases} 0° \leq H \leq 50° \\ 0.2 \leq S \leq 0.68 \\ 0.35 \leq V \leq 1 \end{cases}.$$

In implementing the detail enhancement module (e.g., including the skin tone detector or not including the skin tone detector), all parameters are represented by integers, and the functions other than multiplication, addition, or shift are implemented by either table lookup or approximation methods.

Figure 6:
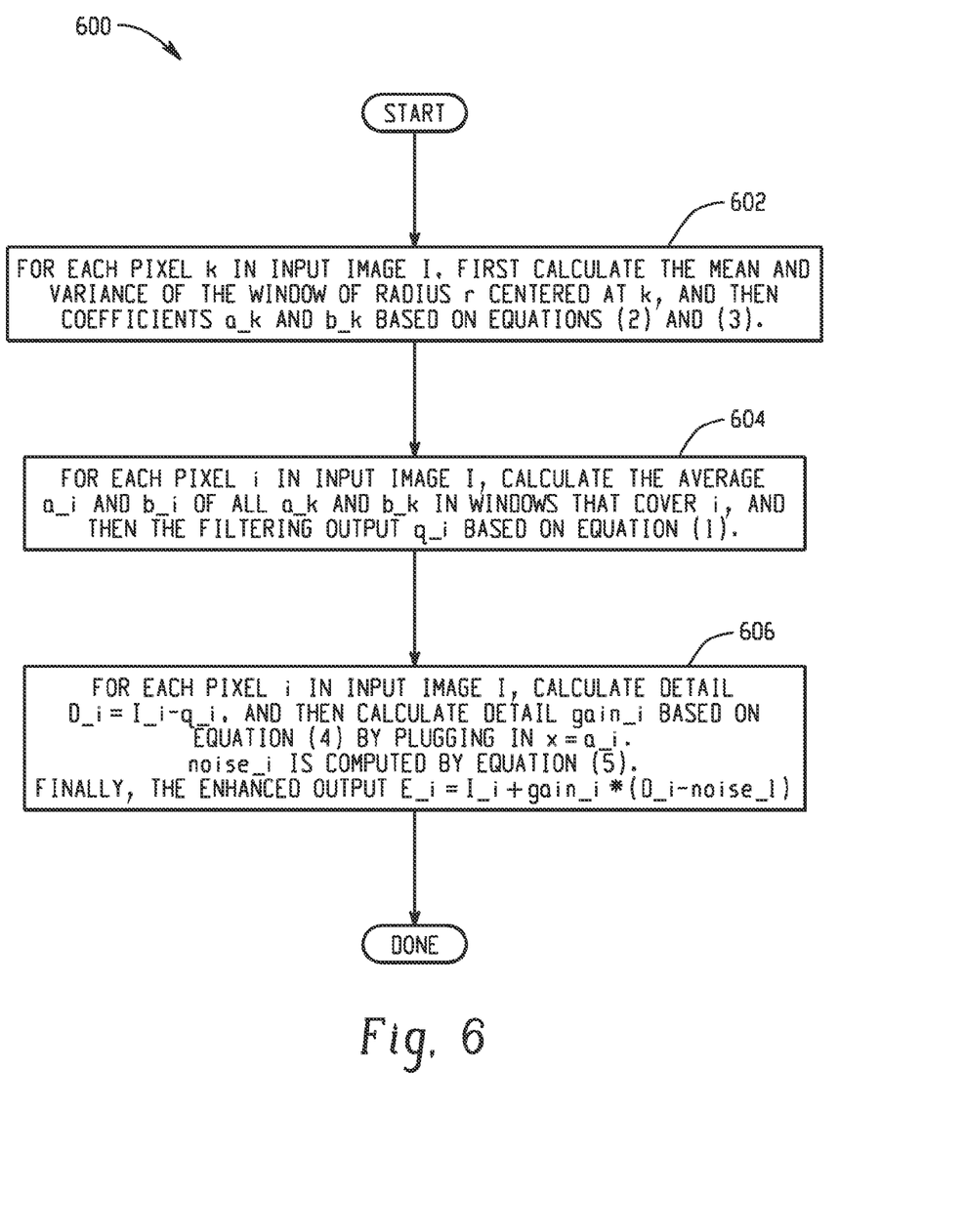
FIG. 6 is a flowchart illustrating example steps for calculating an enhanced output for an input image I.

FIG. 6 is a flowchart 600 illustrating example steps for calculating an enhanced output for an input image I. At 602, for each pixel k in an input image I, the mean and variance are calculated for the window of radius r centered at the pixel k. Further, at 602, the coefficients a_k and b_k are calculated based on Equations 2 and 3. At 604, for each pixel i in the input image I, the average values a_i and b_i of all a_k and b_k in windows that cover the pixel i are calculated. Further, at 604, the filtering output q_i is calculated based on the Equation 1. At 606, for each pixel i in the input image I, the detail D_i=I_i−q_i is calculated, and detail gain_i is then calculated based on the Equation 4 by inserting x=a_i. Further, at 606, noise_i is computed by the Equation 5, and the enhanced output E_i=I_i+gain_i*(D_i−noise_i) is calculated.

Figure 7:
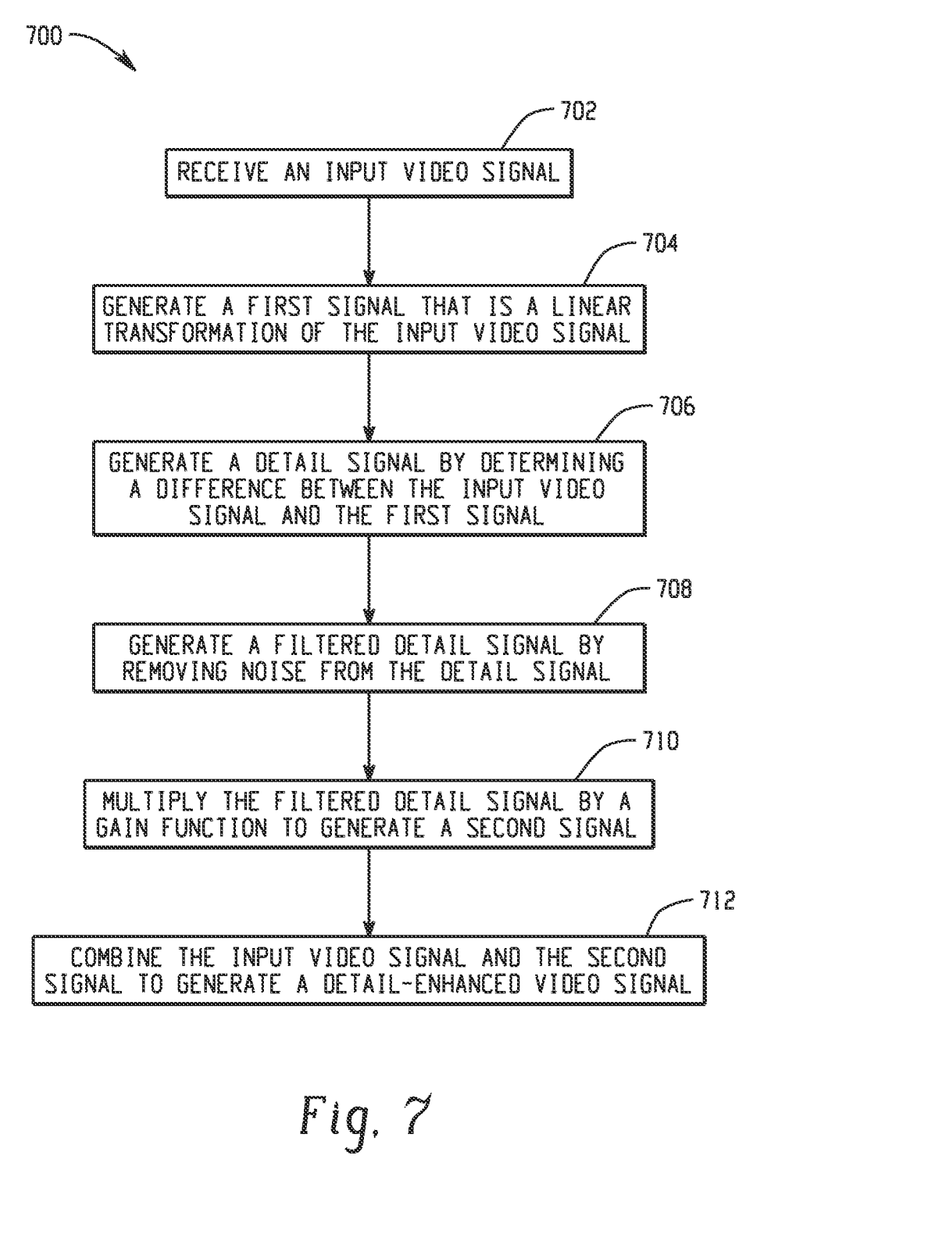
FIG. 7 is a flowchart illustrating an example method for generating a detail-enhanced video signal.

FIG. 7 is a flowchart 700 illustrating an example method for generating a detail-enhanced video signal. At 702, an input video signal is received. At 704, a first signal that is a linear transformation of the guidance signal is generated. At 706, a detail signal is generated by determining a difference between the input video signal and the first signal, where the detail signal includes information that is added to the input video signal to generate the detail-enhanced video signal. At 708, a filtered detail signal is generated by removing noise from the detail signal. At 710, the filtered detail signal is multiplied by a gain function to generate a second signal. The gain function is based on an amount of variance in the input video signal. At 712, the input video signal and the second signal are combined to generate the detail-enhanced video signal.

This written description uses examples to disclose the invention, including the best mode, and also to enable a person skilled in the art to make and use the invention. The patentable scope of the invention may include other examples. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

It is claimed:

1. A system for generating a detail-enhanced video signal, the system comprising;
    a filter that receives an input video signal, the filter being configured to:
        generate a first signal that is a linear transformation of the input video signal, and
        generate a detail signal by determining a difference between the input video signal and the first signal, wherein the detail signal includes information that is added to the input video signal to generate the detail-enhanced video signal;
    a noise reducer configured to generate a filtered detail signal by removing noise from the detail signal;
    a multiplier configured to multiply the filtered detail signal by a gain function to generate a second signal, the gain function being based on an amount of variance in the input video signal; and
    an adder configured to combine the input video signal and the second signal to generate the detail-enhanced video signal.

2. The system of claim 1,
    wherein the input video signal comprises a first plurality of pixels;
    wherein the filtered detail signal comprises a second plurality of pixels;
    wherein the multiplier is configured to multiply a pixel of the second plurality of pixels and a gain value of the gain function;
    wherein the gain value is based on a variance of a group of pixels that includes a pixel of the first plurality of pixels; and
    wherein the pixel of the first plurality of pixels and the pixel of the second plurality of pixels have same x-y coordinates.

3. The system of claim 1, wherein the second signal is defined by $$\Delta Y_{det}=(D-\text{noise})*\text{gain},$$

where $\Delta Y_{det}$ is the second signal, D is the detail signal, noise is the noise removed from the detail signal, and gain is the gain function.

4. The system of claim 1, wherein the linear transformation is defined by $$q_i=\overline{a}_i I_i+\overline{b}_i,$$

where $I_i$ is a value of a pixel i of the input video signal, $q_i$ is a pixel of the first signal corresponding to the pixel i, $\bar{a}$ is a first average coefficient that is indicative of the variance of a group of pixels including the pixel i, $\bar{b}$ is a second average coefficient that is indicative of a mean value of the group of pixels.

5. The system of claim 4, wherein the gain function is based on the variable $\bar{a}$.

6. The system of claim 4, wherein the wain function is defined by $$\text{gain} = \begin{cases} \text{scale} * \exp\left(-\frac{(\bar{a}-mid)^2}{\sigma_{g1}^2}\right) & \text{for } \bar{a} < mid \\ \text{scale} * \exp\left(-\frac{(\bar{a}-mid)^2}{\sigma_{g2}^2}\right) & \text{for } \bar{a} >= mid \end{cases},$$

where gain is a value of the gain function at a particular value of $\bar{a}$, and mid, $\sigma_{g1}^2$, $\sigma_{g2}^2$, and scale are parameters that control a distribution of the gain function.

7. The system of claim 4, wherein the noise reducer utilizes an equation for calculating the noise in the detail signal, and wherein the equation is based on the variable $\bar{a}$.

8. A method for generating a detail-enhanced video signal, the method comprising:
receiving an input video signal;
generating a first signal that is a linear transformation of the input video signal;
generating a detail signal by determining a difference between the input video signal and the first signal, wherein the detail signal includes information that is added to the input video signal to generate the detail-enhanced video signal;
generating a filtered detail signal by removing noise from the detail signal;
multiplying the filtered detail signal by a gain function to generate a second signal, the gain function being based on an amount of variance in the input video signal; and
combining the input video signal and the second signal to generate the detail-enhanced video signal.

9. The method of claim 8, wherein the input video signal comprises a first plurality of pixels, and wherein the filtered detail signal comprises a second plurality of pixels, the method further comprising:
multiplying a pixel of the second plurality of pixels and a gain value of the gain function, wherein the gain value is based on a variance of a group of pixels that includes a pixel of the first plurality of pixels, and wherein the pixel of the first plurality of pixels and the pixel of the second plurality of pixels have same x-y coordinates.

10. The method of claim 8, wherein the second signal is defined by $$\Delta Y_{det} = (D - \text{noise}) * \text{gain},$$

where $\Delta Y_{det}$ is the second signal. D is the detail signal, noise is the noise removed from the detail signal, and gain is the gain function.

11. The method of claim 8, wherein the linear transformation is defined by $$q_i = \bar{a}_i I_i + \bar{b}_i,$$

where $I_i$ is a value of a pixel i of the input video signal, $q_i$ is a pixel of the first signal corresponding to the pixel i, $\bar{a}$ is a first average coefficient that is indicative of the variance of a group of pixels including the pixel i, $\bar{b}$ is a second average coefficient that is indicative of a mean value of the group of pixels.

12. The method of claim 11, wherein the gain function is based on the variable $\bar{a}$.

13. The method of claim 11, wherein the gain function is defined by $$\text{gain} = \begin{cases} \text{scale} * \exp\left(-\frac{(\bar{a}-mid)^2}{\sigma_{g1}^2}\right) & \text{for } \bar{a} < mid \\ \text{scale} * \exp\left(-\frac{(\bar{a}-mid)^2}{\sigma_{g2}^2}\right) & \text{for } \bar{a} >= mid \end{cases},$$

where gain is a value of the gain function at a particular value of $\bar{a}$, and mid, $\sigma_{g1}^2$, $\sigma_{g2}^2$, and scale are parameters that control a distribution of the vain function.

14. The method of claim 11, further comprising:
utilizing an equation for calculating the noise in the detail signal, wherein the equation is based on the variable $\bar{a}$.

15. The system of claim 1, wherein the multiplying, by the multiplier includes, for each respective pixel in the filtered detail signal, multiplying the respective pixel by the gain value to generate a correspondingly-located pixel in the second signal, and
wherein the gain value is a function of variance in a region that the respective pixel is located in, such that (i) the gain value peaks at a mid value of variance, (ii) from the mid value the gain value decreases with increasing variance, and (iii) from the mid value the gain value decreases with decreasing variance.

16. The system of claim 15, wherein the function of the gain value versus variance is bowed from a variance value below the mid value to a variance value above the mid value.

17. The method of claim 8, wherein the multiplying includes, for each respective pixel in the filtered detail signal, multiplying the respective pixel by the gain value to generate a correspondingly-located pixel in the second signal, and
wherein the gain value is a function of variance in a region that the respective pixel is located in, such that (i) the gain value peaks at a mid value of variance, (ii) from the mid value the gain value decreases with increasing variance, and. (iii) from the mid value the gain value decreases with decreasing variance.

18. The method of claim 17, wherein the function of the gain value versus variance is bowed from a variance value below the mid value to a variance value above the mid value.

19. The system of claim 1, wherein the system is configured, for a pixel that is in the input signal and that has a color within the ranges $0° \leq H \leq 50°$ and $0.2 \leq S \leq 0.68$ and $0.35 \leq V \leq 1$, to (i) set the gain function for the pixel to a gain value that is predetermined for skin and (ii) set the noise to be removed for the pixel to a noise value that is predetermined for skin.

20. The method of claim 8, further comprising
for a pixel, in the input signal, having a color within the ranges $0° \leq H \leq 50°$ and $0.2 \leq S \leq 0.68$ and $0.35 \leq V \leq 1$, both
setting the gain function for the pixel to a gain value that is predetermined for skin, and
setting the noise to be removed for the pixel to a noise value that is predetermined for skin.

* * * * *